US010007348B2

(12) United States Patent
Jeon

(10) Patent No.: US 10,007,348 B2
(45) Date of Patent: Jun. 26, 2018

(54) METHOD AND SYSTEM FOR CONTROLLING VIRTUAL CAMERA IN VIRTUAL 3D SPACE AND COMPUTER-READABLE RECORDING MEDIUM

(71) Applicant: Jae Woong Jeon, Seoul (KR)

(72) Inventor: Jae Woong Jeon, Seoul (KR)

( * ) Notice: Subject to any disclaimer, the term of this patent is extended or adjusted under 35 U.S.C. 154(b) by 0 days. days.

(21) Appl. No.: 14/436,085

(22) PCT Filed: Oct. 16, 2013

(86) PCT No.: PCT/KR2013/009260
§ 371 (c)(1),
(2) Date: Apr. 16, 2015

(87) PCT Pub. No.: WO2014/062001
PCT Pub. Date: Apr. 24, 2014

(65) Prior Publication Data
US 2015/0241980 A1 Aug. 27, 2015

(30) Foreign Application Priority Data
Oct. 16, 2012 (KR) ........................ 10-2012-0114780

(51) Int. Cl.
*G06F 3/01* (2006.01)
*G06F 3/0488* (2013.01)
(Continued)

(52) U.S. Cl.
CPC ............ *G06F 3/017* (2013.01); *G06F 3/0346* (2013.01); *G06F 3/0488* (2013.01);
(Continued)

(58) Field of Classification Search
CPC ...... G06F 3/0488; G06F 3/0346; G06F 3/017; G06F 3/048; G06F 3/04817; G06F 3/04845; G06F 3/04886; H04N 13/02
See application file for complete search history.

(56) References Cited

U.S. PATENT DOCUMENTS

| | | | | |
|---|---|---|---|---|
| 2010/0045703 A1* | 2/2010 | Kornmann | ............ | G06F 1/1626 345/653 |
| 2011/0227913 A1* | 9/2011 | Hyndman | ............... | A63F 13/10 345/419 |
| 2012/0194442 A1* | 8/2012 | Sheeley | ................ | G06F 3/0416 345/173 |

FOREIGN PATENT DOCUMENTS

| | | |
|---|---|---|
| KR | 10-2003-0060492 A | 7/2003 |
| KR | 10-2010-0110658 A | 10/2010 |

(Continued)

OTHER PUBLICATIONS

International Search Report and Written opinion for PCT Application PCT/KR2013/009260, Korean Intellectual Property Office, dated Feb. 7, 2014.

*Primary Examiner* — Abhishek Sarma
(74) *Attorney, Agent, or Firm* — Dinsmore & Shohl LLP

(57) ABSTRACT

The present invention relates to a method and a system for controlling a virtual camera in a virtual 3D space and a computer-readable recording medium. According to one embodiment of the present invention, provided is the system for controlling the virtual camera in the virtual 3D space, comprising: a user interface module for providing a user interface so as to receive inputted control data of the virtual camera; and a camera control module for establishing a movement surface of the virtual camera and controlling properties of the virtual camera according to the control data, wherein the properties of the virtual camera includes at least some of position, view, visual field, and movement (Continued)

track of the virtual camera, wherein the position is limited to the movement surface or to a surrounding area thereof.

13 Claims, 6 Drawing Sheets

(51) Int. Cl.
    *G06F 3/0346*     (2013.01)
    *G06F 3/0484*     (2013.01)
    *G06F 3/0481*     (2013.01)

(52) U.S. Cl.
    CPC ...... *G06F 3/04817* (2013.01); *G06F 3/04845* (2013.01); *G06F 3/04886* (2013.01)

(56) References Cited

FOREIGN PATENT DOCUMENTS

| | | |
|---|---|---|
| KR | 10-2011-0096623 A | 8/2011 |
| KR | 10-2011-0116275 A | 10/2011 |
| KR | 10-2011-0129171 A | 12/2011 |

\* cited by examiner

METHOD AND SYSTEM FOR CONTROLLING VIRTUAL CAMERA IN VIRTUAL 3D SPACE AND COMPUTER-READABLE RECORDING MEDIUM

FIELD OF THE INVENTION

The present invention relates to a method and system for controlling a virtual camera in a virtual 3D space, and a computer-readable recording medium therefor.

BACKGROUND

Recently, there is a growing demand for contents that may be represented in three dimensions (3D) even on a two-dimensional (2D) screen of digital equipment such as a personal computer or mobile terminal device. (Hereinafter, such contents are referred to as "3D contents", for convenience.) One good example of the 3D contents is 3D animation authored by a 3D animation authoring program from ANIPEN, Inc.

The inventor(s) has disclosed an invention related to a novel 3D animation authoring method or the like in PCT International Publication No. WO 2011/149160 (the contents of which are to be regarded as being incorporated herein by reference in its entirety) so that users may author 3D contents by only using relatively simple tools or interfaces. In such an invention or other inventions to implement visual representations in an assumed virtual 3D space, it is crucial to control a virtual camera in the virtual 3D space.

In this connection, the inventor(s) present herein a novel technique for controlling a virtual camera in a virtual 3D space.

SUMMARY OF THE INVENTION

One object of the present invention is to solve all the above problems in prior art.

Another object of the invention is to allow a user to easily control a virtual camera in a virtual 3D space.

Yet another object of the invention is to allow a user to fully control a virtual camera in a virtual 3D space even with a 2D user interface.

According to one aspect of the invention to achieve the objects as described above, there is provided a system for controlling a virtual camera in a virtual 3D space, comprising: a user interface module to provide a user interface for receiving control data for the virtual camera; and a camera control module to establish a movement surface of the virtual camera and to control properties of the virtual camera according to the control data, wherein the properties include at least some of a position, line of sight, field of view, and movement trajectory of the virtual camera, and the position is limited onto or in the vicinity of the movement surface.

In addition, there are further provided other methods and systems to implement the invention, as well as computer-readable recording media having stored thereon computer programs for executing the methods.

According to the invention, a user may easily control a virtual camera in a virtual 3D space.

According to the invention, a user may fully control a virtual camera in a virtual 3D space even with a 2D user interface.

DETAILED DESCRIPTION OF THE PREFERRED EMBODIMENTS

Figure 1:
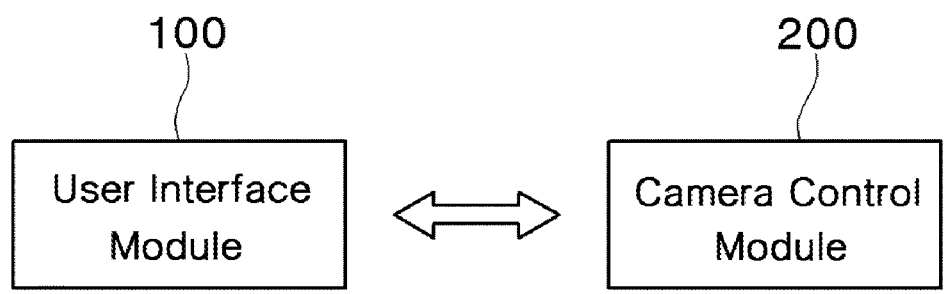
FIG. 1 is a schematic diagram showing the configuration of an entire system for controlling a virtual camera in a virtual 3D space according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the locations or arrangements of individual elements within each of the embodiments may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Configuration of the Entire System

FIG. 1 is a schematic diagram showing the configuration of an entire system for controlling a virtual camera in a virtual 3D space according to one embodiment of the invention.

As shown, the system for controlling a virtual camera in a virtual 3D space according to one embodiment of the invention may comprise a user interface module 100 and a camera control module 200. The virtual camera control system may be implemented collectively in one operational unit, or distributively in two or more operational units. For example, all of the modules of the virtual camera control system may be included in a user terminal device (not shown) (e.g., a desktop computer, a notebook computer, a workstation, a personal digital assistant (PDA), a web pad (particularly a smart pad), a mobile phone (particularly a smart phone) or the like), which is commonly required to utilize and control a virtual camera. However, some of the modules may be included in digital equipment other than the user terminal device (not shown) (e.g., a 3D content providing server), which may communicate with the user terminal device.

In any case, the user interface module 100 and the camera control module 200 may communicate with each other by means of a communication network (not shown) or a processor (not shown). In the former case, the communication network may be implemented regardless of communication modality such as wired and wireless communications, and may be constructed from a variety of communication networks such as local area networks (LANs), metropolitan area networks (MANs), and wide area networks (WANs). Preferably, the communication network described herein may be the Internet or the World Wide Web (WWW). However, the communication network is not necessarily limited thereto, and may at least partially include known wired or wireless data communication networks, known telephone networks, or known wired or wireless television networks. In the latter case, the processor may control data flow provided or exchanged between the above modules in the devices.

Meanwhile, the user interface module 100 and the camera control module 200 may be included in the virtual camera control system in the form of operating systems, application program modules or other program modules, while they may be physically stored in a variety of commonly known storage devices. Meanwhile, such program modules may include, but not limited to, routines, subroutines, programs, objects, components, data structures and the like for performing specific tasks or executing specific abstract data types as will be described below in accordance with the invention.

The user interface module 100 may function to provide a user interface to allow a user to control a virtual camera for imaging 3D contents such as 3D animation in a virtual 3D space by means of the user's terminal device. In other words, the user interface module 100 may allow the user to control a position, line of sight, field of view, movement trajectory and the like of the virtual camera only with the most convenient modes of manipulation (e.g., inputting a path by a touch on a screen of a smart pad, specifying an object by a touch, inputting a sketch gesture, and the like). The specific configuration and function of the user interface module 100 will be discussed in more detail below.

Meanwhile, the camera control module 200 may function to control the position, line of sight, field of view, movement trajectory and the like of the virtual camera according to data that the user has inputted by means of the user interface. Examples of the controllable properties of the virtual camera may be as follows:

Position: a position of the virtual camera, which may be represented as P(x, y, z), for example;

Look-at vector: a vector representing a line of sight of the virtual camera, or a center line of a field of view of the virtual camera;

Direction vector: a vector representing how much an imaging unit of the virtual camera is tilted in a pitch direction, yaw direction and/or roll direction; and Field-of-view angle: an angle representing a field of view in which the virtual camera may perform imaging (there may be vertical and horizontal field-of-view angles.)

The specific configuration and function of the camera control module 200 will be also discussed in more detail below.

User Interface and Control of the Virtual Camera

In the following, a user interface that may be provided by the user interface module 100, and control of the virtual camera that may be performed via the user interface, will be discussed. In the present embodiment, the user interface may preferably be in the form of a widget.

Figure 2:
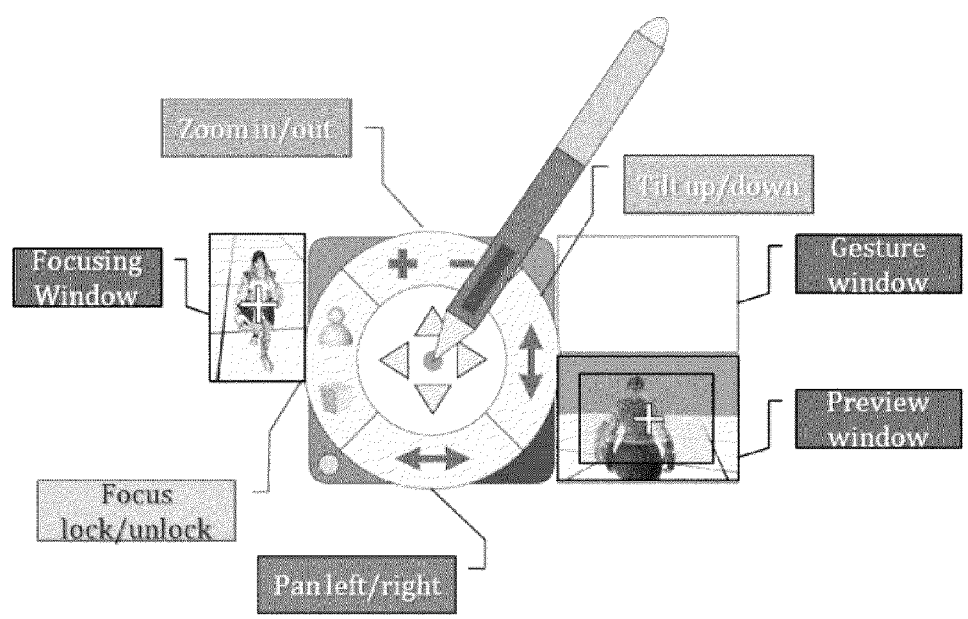
FIGS. 2 and 3 illustratively show a user interface according to one embodiment of the invention.
Figure 3:
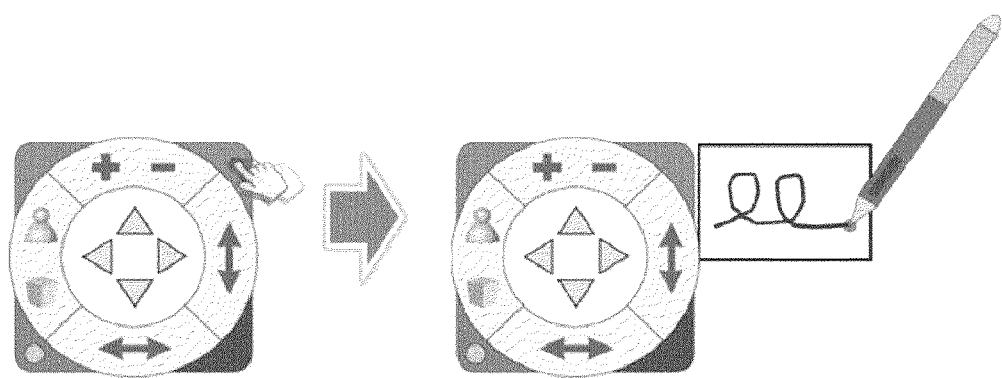

FIGS. 2 and 3 illustratively show a user interface according to one embodiment of the invention.

As shown in detail in FIG. 2, the user interface may be provided to a user in the form of graphics or hardware, and may be configured to allow the user to issue control commands (i.e., to input control data) as below:

Fold up/out: folding or unfolding the user interface itself;

Zoom in/out: zooming in/out the virtual camera;

Tilt up/down: tilting up/down the virtual camera;

Pan left/right: panning the virtual camera to the left/right;

Frustum view on/off: turning on or off a frustum view; and

Focus lock/unlock: focusing the virtual camera and then locking the camera or unlocking the focusing (e.g., focusing the virtual camera on an animation object such as a character, or on a specific portion of a ground surface of animation, and then locking the camera or unlocking the focusing).

Meanwhile, by means of a focusing window that may be included in the user interface, the user may select a specific portion to focus on from among the portions that the virtual camera is imaging. The virtual camera may accordingly perform the focusing.

Further, by means of a preview window that may also be included in the user interface, the user may check in real time the scenes that the virtual camera is imaging.

Furthermore, by means of a gesture window that may also be included in the user interface, the user may input gestures in the manner of sketching or the like (means for the sketching may be a finger, an electronic pen, a touch pen or the like) to input control data for the virtual camera, which have already been matched with the gestures in the user interface module 100, or to adjust various weights on the control data in the manner of drawing graphs. (In connection with the above, further reference may be made to FIG. 3.)

Although various windows of the user interface have been described above, it is apparent to those skilled in the art that at least some of the windows may be replaced with a screen of the user terminal device.

According to the results of the user's control by means of the user interface, the values of the properties such as a position, line of sight, and field of view of the virtual camera may be determined, sequentially as necessary. The determined property values of the virtual camera may be used to constitute a motion sequence of the virtual camera.

Between each set of the property values of the virtual camera constituting the motion sequence, additional property values of the virtual camera may be further determined by interpolation. That is, the user is allowed to substantially sequentially determine the property values of the virtual camera according to the lapse of time. Thereafter, the user may check in real time the scenes imaged by the virtual camera using the preview window of the user interface, as necessary, and then input gestures in the manner of sketching by means of the gesture window to further perform the control of the virtual camera (as a compensation) or to adjust the property values of the virtual camera.

The above-described user interface may be placed and displayed in correspondence to a camera movement surface, a ground surface of a 3D content in the virtual 3D space, or other locations, as will be described below.

Meanwhile, when the user finishes inputting the control data for the virtual camera by means of the user interface, the camera control module 200 may receive the control data, or the property values of the virtual camera which are determined thereby, to control the virtual camera.

Movement Surface of the Virtual Camera

Hereinafter, utilizing of a movement surface of the virtual camera, which is a unique feature of the invention, will be discussed.

In prior arts, a user is required to determine the position, movement trajectory and the like of the virtual camera each time. This is quite burdensome for the user, especially when performing the control on a 2D screen. Thus, it is suggested herein to establish and use a movement surface of the virtual camera so that the position, movement trajectory and the like of the virtual camera may be properly limited and determined without complicated manipulation by the user.

Figure 4:
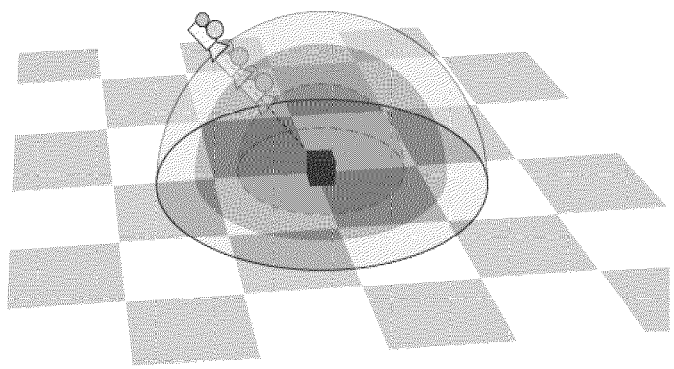
FIG. 4 is a conceptual diagram of a general movement surface of a virtual camera according to one embodiment of the invention.

FIG. 4 is a conceptual diagram of a general movement surface of a virtual camera according to one embodiment of the invention.

As shown, the camera control module 200 may limit the position of the virtual camera, most generally, onto or in the vicinity of the surface of a virtual globe centered at the position of a 3D content object imaged by the camera. (The term, "vicinity" is here and hereafter intended to encompass the situation where the virtual camera is not positioned exactly on the above globe surface due to shake or the like, which may be performed by the camera in some cases, even though the reference surface of the position of the camera is the globe surface.) Here, the size of the virtual globe may be changed according to the control data that the user inputs by means of the user interface. In the following, such a globe surface or the like where the virtual camera is limitedly moved will be referred to as a movement surface of the virtual camera, for convenience.

Of course, in the present embodiment, any definable geometric shape other than a globe may also be employed as a shape to which the position of the virtual camera is limited. For example, such a shape may be oval, conical, cylindrical, polypyramidal, polyprismatic, polyhedral, or the like.

Figure 5:
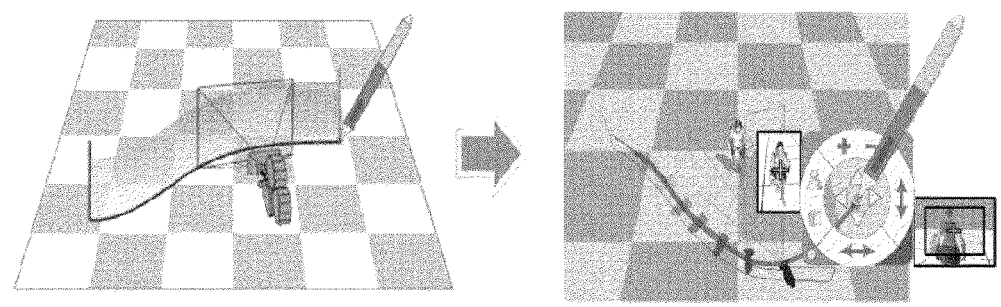
FIG. 5 is a conceptual diagram of a movement surface of a virtual camera according to one embodiment of the invention, when there is a specific path for a 3D content object.

FIG. 5 is a conceptual diagram of a movement surface of a virtual camera according to one embodiment of the invention, when there is a specific path for a 3D content object.

As shown, if there is a specific path for a 3D content object on a ground surface thereof, the camera control module 200 may limit the position of the virtual camera onto or in the vicinity of a virtual movement surface which is upwardly extended from the specific path at a certain degree (e.g., perpendicularly). The above path may be a path on a ground surface of a moving 3D content object, which is spaced apart at a fixed distance from a movement path of the 3D content object on the ground surface (such a path may be automatically determined when the movement of the 3D content object is determined, and the fixed distance may be changed according to the control data that the user inputs by means of the user interface), or may be any path that the user inputs in the manner of sketching on the gesture window of the user interface or the screen of the user terminal device. In the latter case, the inputted sketch path may be a path that is projected onto the ground surface of the 3D content and approximated (by a uniform cubic B-spline).

Meanwhile, the user may modify the path of the virtual camera on the ground surface in the manner of sketching or the like while viewing the scenes that the virtual camera images on the movement surface using the user interface. (In this case, it is natural that other property values of the virtual camera may also be separately changed.)

Figure 6:
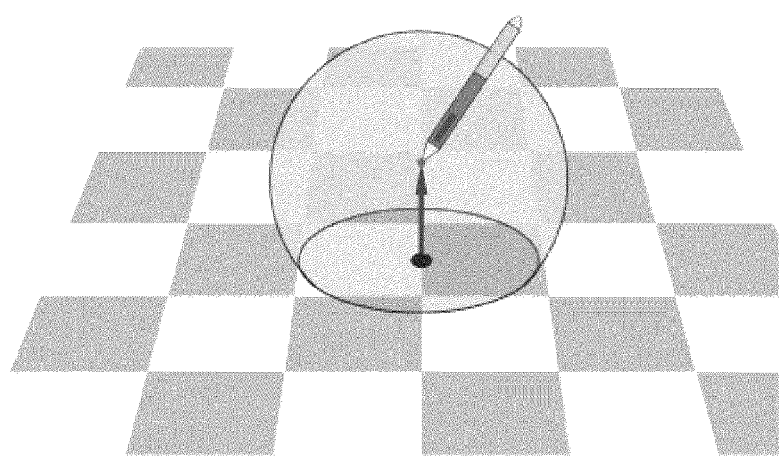
FIG. 6 is a conceptual diagram of a movement surface of a virtual camera according to one embodiment of the invention, when a 3D content object is not on a ground surface.

FIG. 6 is a conceptual diagram of a movement surface of a virtual camera according to one embodiment of the invention, when a 3D content object is not on a ground surface.

As shown, there may be a case in which a 3D content object is not on a ground surface but is elevated over the ground. In this case, the camera control module 200 may limit the position of the virtual camera onto or in the vicinity of the surface of a virtual globe centered at the elevated position. Such limitation may be performed as the user specifies a 3D content object to be imaged by the virtual camera by means of the user interface, but may also be performed as the user selects a portion on the ground surface on the gesture window of the user interface. The selection may be in the manner of sketching starting from the position of the 3D content object, as shown.

Meanwhile, the user may modify the center of the globe surface to which the movement of the virtual camera is limited while viewing the scenes that the virtual camera images on the movement surface using the user interface. (In this case, it is natural that other property values of the virtual camera may also be separately changed.)

Here, the movement surface of the virtual camera, the path on the ground surface which has been used to determine the movement surface, the center of the globe surface as the movement surface, or the like may be stored in the form of a file and used again.

Meanwhile, also in the present embodiment, any definable geometric shape other than a globe may be employed as a shape to which the position of the virtual camera is limited.

The embodiments according to the invention as described above may be implemented in the form of program instructions that can be executed by various computer components, and may be stored on a computer-readable recording medium. The computer-readable recording medium may include program instructions, data files, data structures and the like, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be changed to one or more software modules to perform the processes of the present invention, and vice versa.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A system for controlling a virtual camera in a virtual three-dimensional (3D) space, comprising:
   a user interface module to provide a user interface for receiving control data for the virtual camera; and
   a camera control module to establish a movement surface of the virtual camera according to the control data, and to control properties of the virtual camera according to the control data, wherein the properties include at least some of a position, line of sight, field of view, and movement trajectory of the virtual camera, and the position is limited onto or in the vicinity of the movement surface,
   wherein the movement surface is established based on the position of a portion specified by the control data on a ground surface of a 3D content viewed by the virtual camera,
   wherein the user interface includes a preview window for allowing a user to check scenes imaged by the virtual camera in real time and to adjust values of the properties of the virtual camera in view of the scenes, and
   wherein the user interface includes a focusing window for allowing the user to select a specific portion to focus on from the scenes imaged by the virtual camera.

2. The system of claim 1, wherein the user interface includes a gesture window for receiving gestures.

3. The system of claim 2, wherein the user interface module is capable of matching the control data for the virtual camera with the gestures received via the gesture window.

4. The system of claim 1, wherein the movement surface is established based on a path for a 3D content object viewed by the virtual camera.

5. The system of claim 4, wherein the path for the 3D content object is a movement path of the 3D content object.

6. The system of claim 4, wherein the path for the 3D content object is a path that is received from a user and then projected onto a ground surface of the 3D content.

7. The system of claim 1, wherein the movement surface is established based on the position of a specific 3D content object viewed by the virtual camera.

8. A method for controlling a virtual camera in a virtual 3D space, comprising the steps of receiving control data for the virtual camera via a user interface; and
   establishing a movement surface of the virtual camera according to the control data, and controlling properties of the virtual camera according to the control data, wherein the properties include at least some of a position, line of sight, field of view, and movement trajectory of the virtual camera, and the position is limited onto or in the vicinity of the movement surface
   wherein the movement surface is established based on the position of a portion specified by the control data on a ground surface of a 3D content viewed by the virtual camera,
   wherein the user interface includes a preview window for allowing a user to check scenes imaged by the virtual camera in real time and to adjust values of the properties of the virtual camera in view of the scenes, and
   wherein the user interface includes a focusing window for allowing the user to select a specific portion to focus on from the scenes imaged by the virtual camera.

9. The method of claim 8, wherein the movement surface is established based on a path for a 3D content object viewed by the virtual camera.

10. The method of claim 9, wherein the path for the 3D content object is a movement path of the 3D content object.

11. The method of claim 9, wherein the path for the 3D content object is a path that is received from a user and then projected onto a ground surface of the 3D content.

12. The method of claim 8, wherein the movement surface is established based on the position of a specific 3D content object viewed by the virtual camera.

13. A non-transitory computer-readable recording medium having stored thereon a computer program for executing the method of claim 8.

* * * * *